(12) United States Patent
Noel

(10) Patent No.: US 6,360,587 B1
(45) Date of Patent: Mar. 26, 2002

(54) PRE-IGNITION DETECTOR

(75) Inventor: Robert A. Noel, Anderson, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/635,964

(22) Filed: Aug. 10, 2000

(51) Int. Cl.$^7$ ............................................. G01L 23/22
(52) U.S. Cl. ................................... 73/35.08; 73/35.06
(58) Field of Search .......................... 73/23.21, 23.32, 73/35.03, 35.04, 35.06, 35.07, 35.08, 116; 123/620; 324/399, 393

(56) References Cited

U.S. PATENT DOCUMENTS

| | | | |
|---|---|---|---|
| 5,675,072 A | 10/1997 | Yasuda et al. ............. | 73/35.08 |
| 5,676,113 A | 10/1997 | Johansson et al. .......... | 123/425 |
| 5,769,049 A | 6/1998 | Nytomt et al. ............. | 123/435 |
| 5,775,298 A | 7/1998 | Haller ...................... | 123/425 |
| 5,803,047 A | 9/1998 | Rask ....................... | 123/425 |
| 5,814,994 A | 9/1998 | Hohner et al. ............. | 324/380 |
| 5,866,808 A | 2/1999 | Ooyabu et al. ............. | 73/116 |
| 5,914,604 A | * 6/1999 | Bahr et al. ................ | 324/399 |
| 6,054,859 A | * 4/2000 | Takahashi et al. .......... | 324/399 |
| 6,092,015 A | * 7/2000 | Takahashi et al. .......... | 701/101 |
| 6,118,276 A | * 9/2000 | Nakata et al. ............. | 324/464 |
| 6,196,054 B1 | * 3/2001 | Okamura et al. ........... | 73/35.08 |

OTHER PUBLICATIONS

NGK Spark Plugs—computer printout Mar. 8, 2000—2 pages.

* cited by examiner

*Primary Examiner*—Richard A. Moller
(74) *Attorney, Agent, or Firm*—Margaret A. Dobrowitsky

(57) ABSTRACT

An apparatus for detecting a pre-ignition combustion condition in an internal combustion engine. An ion sensing circuit measures an ion current during the ignition coil charging time. An ion current level above a predetermined reference level indicates pre-ignition combustion. A powertrain control module is responsive to a pre-ignition signal for discontinuing delivery of fuel to the cylinder in which the ion current was measured.

12 Claims, 2 Drawing Sheets

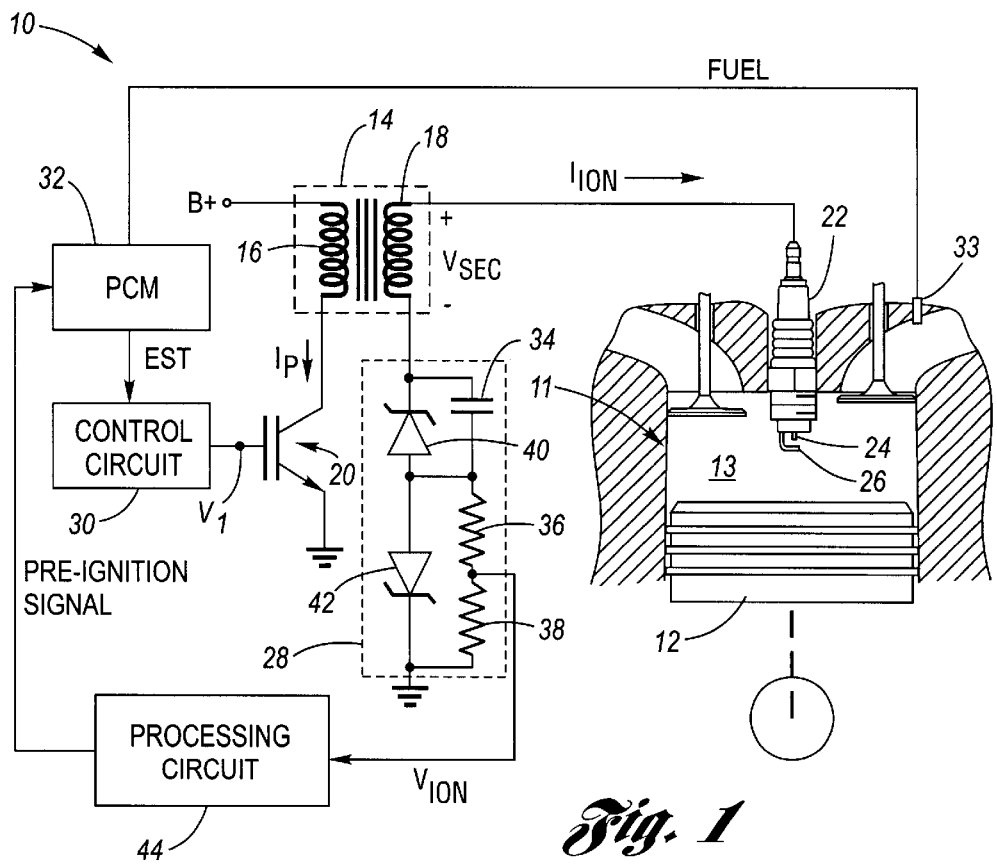
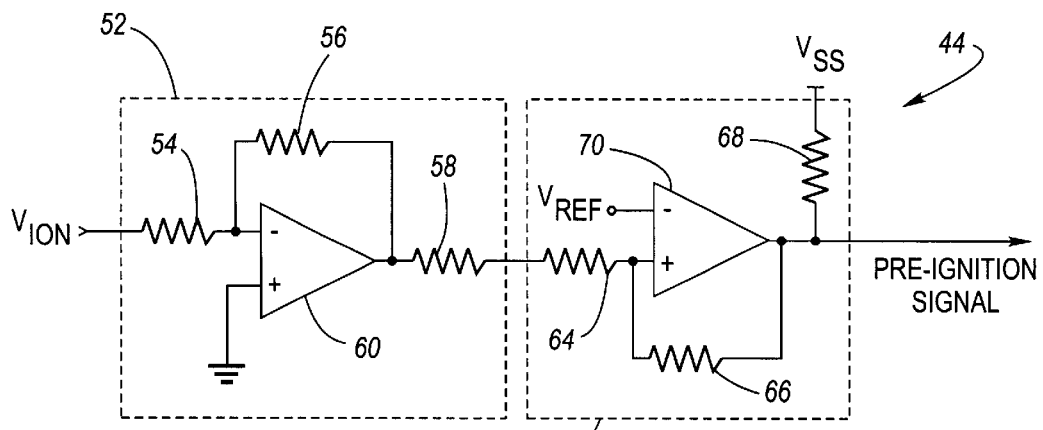
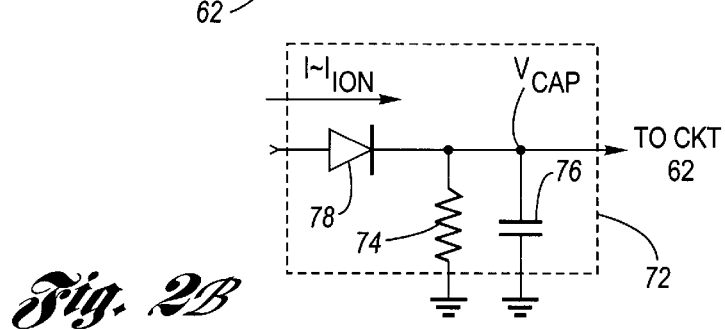

PRE-IGNITION DETECTOR

BACKGROUND OF THE INVENTION

1. FIELD OF THE INVENTION

The present invention relates generally to a system for detecting a condition in an internal combustion engine, and more particularly, to a system configured to detect a pre-ignition condition within a combustion chamber of the engine.

2. DESCRIPTION OF THE RELATED ART

A condition called "pre-ignition" combustion is known for internal combustion engines when spontaneous combustion of the air/fuel mixture occurs before a spark is generated by the ignition system. Pre-ignition may occur when the engine is running at high output or wide-open throttle, because of the corresponding increase in temperature, especially of the spark plug itself. Pre-ignition is a serious condition, since it may cause an engine failure due to overheating of the piston dome and cylinder head.

One approach taken in the art to address this problem involves the development of a heat range for spark plugs having a sequence of steps. A particular step in the heat range refers to how much heat a spark plug is capable of removing from the combustion chamber. Each step "colder" corresponds to an increased ability to remove an additional amount of heat (e.g., 70–100° C.). However, a shortcoming with this approach lies in selecting the correct step in the heat range. If a "colder" plug than needed is chosen, it may prevent pre-ignition, but may also result in plug fouling, due to a spark plug tip temperature that is too low. Fouling is the lesser problem, compared to pre-ignition. Accordingly, it is a frequent occurrence to err on the side of caution, and choose a "colder" plug in the heat range. This result is generally undesirable.

It is also known to sense a combustion condition (e.g., misfire) using a so-called ion sense system. It is known that the combustion of an air/fuel mixture in an engine results in molecules in the cylinder being ionized. It is further known to apply a relatively high voltage across, for example, the electrodes of a spark plug after the ignition operation to produce a current across the electrodes. Such current is known as an ion current. The ion current that flows is proportional to the number of combustion ions present in the area of, for example, the spark plug gap referred to above, and is consequently indicative of the ionization throughout the entire cylinder as combustion occurs. The level or amount of ion current is indicative of the quality of the combustion event, or whether in fact combustion has occurred at all (e.g., a misfire condition).

Conventional ion current sensing systems generally include a capacitor or the like configured to store a voltage as seen by reference to U.S. Pat. No. 5,866,808 issued to Ooyabu et al. Ooyabu et al. disclose an ion sense system that includes a capacitor that is charged during ignition. The stored voltage is thereafter used as a "bias" voltage which is applied to the spark plug to generate the ion current. However, since Ooyabu et al. senses the ion current after the spark, the system cannot distinguish between combustion that occurs due to pre-ignition and combustion that occurs because of the spark. Thus, known ion sense systems, as presently used, offers little to solving the above problems.

There is therefore a need to provide an apparatus for detecting a pre-ignition combustion condition that minimizes or eliminates one or more of the shortcomings as set forth above.

SUMMARY OF THE INVENTION

This invention provides for accurate and reliable detection of a pre-ignition combustion condition by detecting an ion current before the spark event, when there should be no combustion (and therefore no ion current) unless pre-ignition has occurred.

The inventive pre-ignition detector has the advantage of allowing the use of "hotter" spark plugs ("hotter" in the plug's heat range), which reduces the incidence of cold temperature plug fouling. An additional advantage is that it prevents pre-ignition engine related failures, since fuel can be cut off to the cylinder where pre-ignition has been detected.

An apparatus is provided for detecting a pre-ignition condition in a combustion chamber of an internal combustion engine of the type having an ignition coil associated therewith. The coil has a primary winding, and a secondary winding that is connected to a spark plug. The apparatus includes a control circuit, and an ion sense circuit. The control circuit is configured to generate an ignition control signal for controlling a switch connected to the primary winding to thereby cause a primary current to flow through the primary winding. The control circuit is further configured to discontinue the ignition control signal for interrupting the primary current to thereby produce a spark. The ion sense circuit is configured to apply a bias voltage to the spark plug to generate an ion sense signal representative of an ion current through the spark plug. According to the invention, the ion sense circuit is operable to generate the ion sense signal prior to the control circuit discontinuing the ignition control signal to generate the spark.

In one embodiment, the ion sense circuit is configured to sense and generate the ion sense signal during a dwell interval.

Other objects, features, and advantages of the present invention will become apparent to one skilled in the art from the following detailed description and accompanying drawings illustrating features of this invention by way of example, but not by way of limitation.

BRIEF DESCRIPTION OF THE DRAWINGS

FIG. 1 is a diagrammatic schematic and block diagram view of an apparatus in accordance with the present invention showing a current flow during an ion current sense interval of operation;

FIG. 2A is a simplified schematic diagram showing, in greater detail, the processing circuit of FIG. 1;

FIG. 2B is a simplified schematic diagram showing an alternate embodiment of the processing circuit of FIG. 1.

DETAILED DESCRIPTION OF THE PREFERRED EMBODIMENTS

Figure 3A:
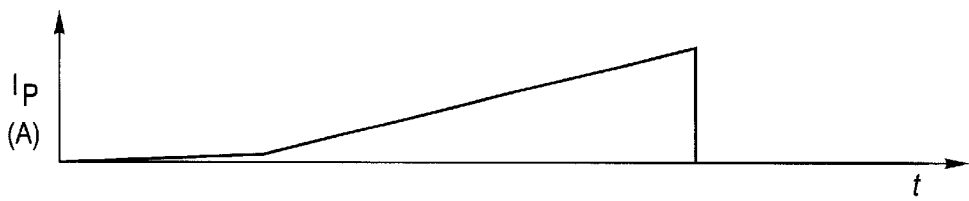
FIGS. 3A–3E are timing diagram views graphically showing the detection of ion current prior to an ignition spark.

Referring now to the drawings wherein like reference numerals are used to identify identical components in the various views, FIG. 1 illustrates an apparatus 10 for detecting a pre-ignition combustion condition in an internal combustion engine 11.

FIG. 1 further illustrates a piston 12, a combustion chamber 13, such as a cylinder, an ignition coil 14 comprising primary winding 16 and secondary winding 18, a switch 20, a spark plug 22 comprising a first electrode 24 and a second electrode 26, an ion current sensing circuit 28, and a control circuit 30, which may comprise, or alternatively be coupled to, a powertrain control module (PCM) 32.

Engine 11 may be of the type having a direct ignition system for initiating combustion. In the illustrated embodiment, one ignition coil is provided per plug 22. Piston 12 is disposed within combustion chamber 13 and is mechanically linked through a connecting rod (not shown) to a crankshaft which rotates as piston 12 reciprocates within combustion chamber 13. Chamber 13 is an individual one of a plurality of cylinders in internal combustion engine 11. In a preferred embodiment, engine 11 comprises a 4-stroke type engine having intake, compression, power, and exhaust strokes for each ignition cycle, as known to those of ordinary skill in the art. Fuel is injected into an intake runner by way of a fuel injector 33 responsive to a control signal FUEL and is mixed with an intake air charge that is passed through the intake runner from an engine intake plenum or manifold (not shown). As is generally understood in the art, the air/fuel mixture is drawn into combustion chamber 13 while an intake valve proximate fuel injector 33 is driven to an open position during an intake stroke of piston 12 within combustion chamber 13. The intake stroke is, of course, followed by a compression stroke, after which an ignition spark is generated in accordance with an ignition control signal EST (electronic spark timing) signal. It is during the compression stroke, after the air/fuel mixture has been introduced, but prior to an ignition spark, that pre-ignition combustion can occur, due to a hot plug tip or the like. As described below, it is during this time (after fuel delivery but before spark) that apparatus 10 checks for pre-ignition.

Ignition coil 14 is configured to function as a selectively controllable step-up transformer. One end, such as the high side end, of primary winding 16 is connected to a supply voltage provided by a power supply, such as a vehicle battery (not shown), hereinafter designated "B+" in the drawings. Supply voltage B+ may nominally be approximately 12 volts. A second end of primary winding 16 opposite the high side end is connected to switch 20. A first end of secondary winding 18, namely the high side end, is coupled to spark plug 22. A second end of secondary winding 18 opposite the high side end, namely the low side end, is connected to a ground node through ion current sensing circuit 28. Primary winding 16 and secondary winding 18 are matched in a predetermined manner known in the art.

Switch 20 is provided to selectively connect primary winding 16 to ground, in accordance with a control voltage on node $V_1$ generated by control circuit 30. Such connection, as is known generally in the art, will cause a primary current $I_p$ to flow through primary winding 16. Switch 20 is illustrated in FIG. 1 as a bipolar transistor; however, it should be understood that such illustration is exemplary only and not limiting in nature. Switch 20 may comprise alternative conventional components known to those of ordinary skill in the art, such as an insulated gate bipolar transistor (IGBT).

Spark plug 22 is disposed in engine 11 proximate combustion chamber 13, and is configured to produce a spark across a gap defined by spaced electrodes 24, 26. The spark event, as is generally understood by those of ordinary skill in the art, is provided to ignite an air and fuel mixture introduced into the combustion chamber 13. During the spark event, a spark current flows across plug electrodes 24, 26. In addition, spark plug 22 is configured so that when a bias voltage is applied across this gap, an ion current, designated $I_{ION}$ in FIG. 1, is conducted across electrodes 24, 26 if combustion has commenced and ionized molecules are present. The magnitude of the ion current is indicative of a combustion condition, such as combustion, and/or misfire. According to the invention, the timing (i.e., after delivery of fuel, but before the spark is produced) of the check is such that any ion current would be indicative of pre-ignition combustion. The greater the ion current (i.e., due to more ionized molecules present in the cylinder), the more advanced the combustion.

Circuit 28 is configured to provide means for sensing the ion current $I_{ION}$ and to generate in response thereto an ion sense signal. In the illustrated embodiment, circuit 28 includes a capacitor 34, a first resistor 36, a second resistor 38, a first zener diode 40, and a second zener diode 42. In apparatus 10, circuit 28 generates an ion sense signal in the form of a voltage signal designated $V_{ION}$ through the routing of the ion current through resistors 36 and 38. The values of resistors 36, 38 may be selected, based on the electrical characteristics of plug 22, and the bias level (i.e., voltage level) set by zener 40, to develop $V_{ION}$ within a desired magnitude range. In a constructed embodiment, zener 40 may have a reverse breakdown voltage of 82 volts. Accordingly, capacitor 34 will be charged to 82 volts on the first occurrence of an ignition spike generated to produce the ignition spark. Thereafter, approximately 82 volts will be available for biasing plug 22 during subsequent dwell intervals, in a preferred embodiment, to produce the ion current $I_{ION}$. To the extent capacitor 34 loses charge during the subsequent pre-ignition detection, it is re-charged during the immediately succeeding ignition spike. Other configurations are possible, which are within the spirit and scope of the present invention. The art is replete with configurations for producing a suitable biasing voltage for ion current sensing for example, as disclosed in U.S. Pat. No. 5,769,049 entitled "METHOD AND SYSTEM FOR CONTROLLING COMBUSTION ENGINES", assigned to Mecel AB, which incorporates a single resistance in lieu of resistors 36 and 38. It should be further understood that the ion sense signal may be a current signal proportional to the ion current, and therefore representative of such ion current in a predetermined manner (e.g., through use of a current mirror circuit).

Control circuit 30 is configured generally to control the opening and closure of switch 20 by controlling, for example, a voltage level at node $V_1$ in a manner generally understood by those of ordinary skill in the art of ignition control. In the illustrated embodiment shown in FIG. 1, control circuit 30 is configured to control the state of conduction of switch 20 in accordance with the state of an input signal thereto, namely an ignition control signal EST (electronic spark timing). The ignition control signal EST may be generated by, for example, powertrain control module (PCM) 32 in accordance with known ignition control strategies. Control circuit 30 may be an ignition control module. Control circuit 30 may comprise conventional components. The art is replete with various approaches for implementing a control circuit for driving switch 20 in response to the ignition control signal EST. It should be understood that the functionality of PCM 32 and control circuit 30 may be combined into a single circuit, as opposed to being distributed into two circuits, as illustrated.

FIG. 1 further illustrates a processing circuit 44 that is responsive to the ion sense signal $V_{ION}$ for generating a pre-ignition signal, which is fed to PCM 32. The assertion of the pre-ignition signal indicates that pre-ignition combustion has occurred. PCM 32 may use the pre-ignition signal to discontinue delivery of fuel to combustion chamber 13 during the next X number of ignition cycles, where X is a predetermined number selected to allow cooling off of spark plug 22, as well as other internal components and surfaces inside of combustion chamber 13 to thereby minimize or eliminate pre-ignition.

For example only, the fuel to a particular cylinder may be withheld for approximately 10–30 cycles, at which time the cylinder is again checked for pre-ignition. Alternatively, fuel may be withheld from the cylinder for 20–30 seconds, at which time, the cylinder is again checked for pre-ignition. Other variations are possible, such as turning the engine off completely.

Referring now to FIG. 2A, an exemplary signal processing circuit 44 is illustrated. Circuit 44 includes an inverter circuit 52 comprising resistors 54, 56, and 58, and an op amp 60, and a comparator circuit 62 comprising resistors 64, 66, and 68, and a comparator 70. Circuit 52 inverts the raw ion signal $V_{ION}$. The inverted ion voltage signal is then compared to a predetermined reference voltage, designated $V_{REF}$ in FIG. 2A. When comparator 70 generates a digital output pulse, such pulse is indicative of pre-ignition combustion. When component 70 fails to generate a pulse, the lack of a pulse means a misfire has occurred.

FIG. 2B shows a modification of the processing circuit 44 shown in FIG. 2A. An integrator circuit 72 includes a resistor 74, a capacitor 76 and a diode 78. Resistor 74 may be a relatively high valued component (e.g., 1M ohm), or may be omitted entirely. A charging current I proportional to the generated ion current $I_{ION}$ is received through diode 78 and charges capacitor 76. The diode 78 prevents charge from leaking off of capacitor 76. Capacitor 76 operates to integrate the ion sense signal $V_{ION}$, which accumulates on capacitor 76 as $V_{CAP}$. This "integrated" signal may thereafter be compared to a reference voltage $V_{REF}$ in a manner described above.

Figure 3B:
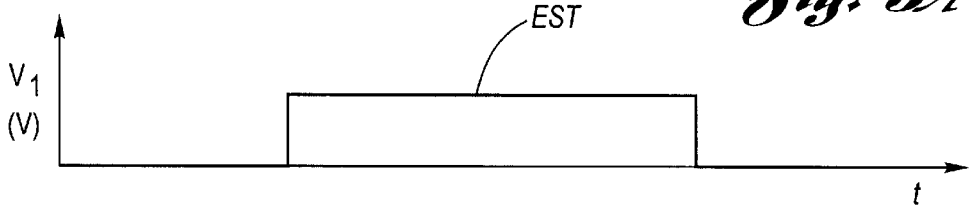

Referring now to FIGS. 3A–3E, and with continued reference to FIG. 1, the operation of an embodiment according to the present invention will now be set forth. PCM 32, in accordance with a predetermined operating strategy, based on a plurality of engine operating parameter inputs, determines when to assert the ignition control signal EST. The asserted ignition control signal EST is the command to commence charging of ignition coil 14 for a spark event. Control circuit 30, in response thereto, adjusts the control voltage on node $V_1$, which causes switch 20 to conduct, wherein a primary current $I_p$ flows through primary winding 16, which is shown in FIG. 3A. The assertion of the ignition control signal EST is shown in FIG. 3B.

Ignition control signal EST is applied, in the illustrated embodiment, as a positive going pulse having a duration corresponding to a desired primary ignition coil charge time. As described above, charging of the coil 14 commences at the time of receipt by control circuit 30 of a rising (positive going) edge of the EST signal. Upon receipt of a falling (negative going) edge of the ignition control signal EST, control circuit 30 causes switch 20 to open, thereby causing an interruption in the primary current $I_p$. It is well understood by those of ordinary skill in the art of ignition control that such interruption results in a relatively high voltage being immediately established across secondary winding 18, due to the collapsing magnetic fields associated with the interruption of the primary current. The secondary voltage will continue to rise until reaching a break down voltage across electrodes 24, 26 of spark plug 22. Current will thereafter discharge across the gap, as is generally understood in the art. During the spark event, a relatively large negative (relative to ground) voltage is established at the spark plug. A spark current flows from ground, across spark plug electrodes 24, 26, through secondary winding 18, and thereafter through circuit 28.

The large breakdown voltage that produces the spark causes zener diode 40 to breakdown at its predetermined reverse breakdown voltage, thereby allowing the charging of storage capacitor 34 up to such reverse breakdown voltage (e.g., 82 volts in one embodiment). Ion current sensing circuit 28 is now charged. During the next (and subsequent) dwell periods, a pre-ignition sense operation can occur.

Figure 3C:
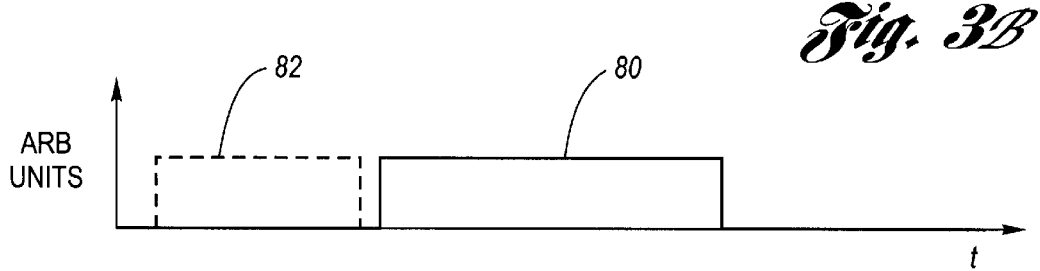

Referring now to FIG. 3C, in accordance with the present invention, an ion current $I_{ION}$ is sensed at any time (i) after fuel delivery, but (ii) prior to the falling (negative going) edge of the ignition control signal EST (i.e., the time when the spark is commanded). In a preferred embodiment, the sensing occurs during a first ion current detection window 80, which may be turned on with the rise of the EST signal, and turned off at the fall of the EST signal, inasmuch as the time to charge coil 14 does not change with engine speed (RPM). Stated another way, the sensing occurs during the dwell interval, which corresponds to the duration of the EST signal. Other detection windows, such as a second detection window 82 shown in FIG. 3C, may alternatively be employed. Before normal ignition (i.e., prior to the falling edge of the EST signal, which interrupts primary current to produce a spark) there should not be any free ions available in combustion chamber 13 from burning gasoline therein, and accordingly, the activation of ion sensing circuit 28 should not produce an ion current flow, in a normal, non pre-ignition condition. With an ion detection circuit operating before ignition firing, it would detect pre-ignition, if present, in the combustion chamber 13. If the combustion chamber is in a pre-ignition condition, the fuel therein would have been ignited due to pressure and temperature, and therefore free ions would be available because of the burning fuel.

Figure 3D:
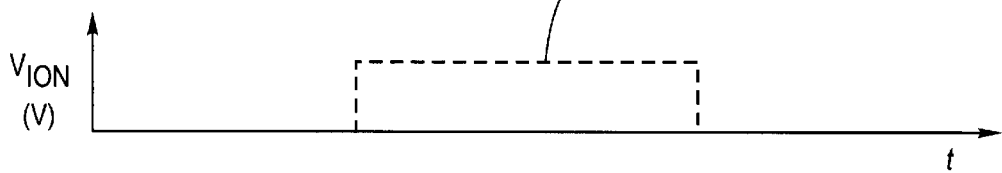

Therefore, when first window 80 "opens" (i.e. upon the rising edge, in the illustrated embodiment), capacitor 34 biases spark plug 22 with a relatively positive voltage. If pre-ignition combustion has occurred, the bias voltage will cause an ion current $I_{ION}$ to flow. Such current will flow from capacitor 34, through secondary 18, across electrodes 24, and 26 to ground, and then through resistors 36 and 38 to the other side of capacitor 34. The ion current flows through the resistors, inasmuch as diode 42 is back-biased. The configuration illustrated in FIG. 1 will result in a negative voltage being developed at the common node of the voltage divider formed by resistors 36 and 38. This negative voltage defines an ion sense signal, designated $V_{ION}$. As described in connection with FIG. 2A, this signal may be inverted before further processing occurs. The magnitude of the ion current, and thus the magnitude of the corresponding voltage $V_{ION}$ is dependent upon the concentration of ions, which in turn corresponds to the level of pre-ignition combustion. FIG. 3D shows the response when no pre-ignition combustion occurs.

Figure 3E:
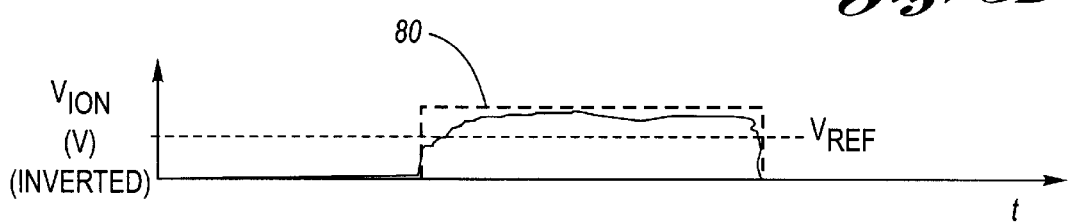

However, if pre-ignition combustion does occur, a relatively large negative ion sense signal $V_{ION}$ is generated, which is shown in inverted into a positive polarity form in FIG. 3E. If the level or magnitude of the ion sense signal $V_{ION}$ exceeds a preselected reference level $V_{REF}$ which is also illustrated in FIG. 3E, then processing circuit 44 will generate the pre-ignition signal, in a manner described above.

The system in accordance with the present invention allows detection of a pre-ignition combustion condition in an internal combustion engine. The pre-ignition detection system according to the invention allows engine cylinder temperatures to be run at a high temperature, since the pre-ignition condition can be monitored and controlled (e.g., fuel delivery can be discontinued when pre-ignition is detected). As a result of the inventive pre-ignition detection system, a higher step heat range spark plug can be used in order to enable better cold starting and reduce spark plug fouling.

It is to be understood that the above description is merely exemplary rather than limiting in nature, the invention being limited only by the appended claims. Various modifications and changes may be made thereto by one of ordinary skill in the art which embody the principles of the invention and fall within the spirit and scope thereof.

I claim:

1. An apparatus for detecting a pre-ignition condition in a combustion chamber of an internal combustion engine having an ignition coil associated therewith, said coil having a primary winding, and a secondary winding that is connected to a spark plug, said apparatus comprising:

a control circuit configured to generate an ignition control signal for controlling a switch connected to said primary winding to thereby cause a primary current to flow through said primary winding, said control circuit being further configured to discontinue said ignition control signal for interrupting said primary current to thereby produce a spark;

an ion sensing circuit configured to apply a bias voltage to said spark plug and generate in response thereto an ion sense signal representative of an ion current through said spark plug; and said ion sensing circuit being operable to generate said ion sense signal prior to said control circuit discontinuing said ignition control signal to thereby detect pre-ignition.

2. The apparatus of claim 1 wherein said engine comprises a four-stroke engine having exhaust, intake, compression and power strokes, said generation of said ion sense signal for pre-ignition detection occurring during said compression stroke.

3. The apparatus of claim 1 wherein a dwell interval is defined between when said ignition control signal is generated and when said ignition control signal is discontinued, said generation of said ion sense signal for pre-ignition detection occurring during said dwell interval.

4. The apparatus of claim 1 wherein said control circuit comprises a powertrain control module having a memory for storing an ignition map defining parameters to control timing of said ignition control signal.

5. The apparatus of claim 4 wherein said powertrain control module is further configured to control delivery of fuel to said combustion chamber, said control module being further configured to discontinue delivery of fuel to said combustion chamber during the next predetermined number of ignition cycles in response to an ion sense signal indicating pre-ignition.

6. An apparatus for detecting a pre-ignition condition in a combustion chamber of an internal combustion engine having an ignition coil associated therewith, said coil having a primary winding, and a secondary winding that is connected to a spark plug, said apparatus comprising:

a control circuit configured to generate an ignition control signal during a dwell interval for controlling a switch connected to said primary winding to thereby cause a primary current to flow through said primary winding, said control circuit being further configured to discontinue said ignition control signal upon expiration of said dwell interval for interrupting said primary current to thereby produce a spark;

an ion sensing circuit configured to apply a bias voltage to said spark plug during said dwell interval and generate an ion sense signal in response thereto representative of an ion current through said spark plug.

7. The apparatus of claim 6 wherein said control circuit comprises a powertrain control module having a memory for storing an ignition map defining parameters to control timing of said ignition control signal.

8. The apparatus of claim 7 wherein said powertrain control module is further configured to control delivery of fuel to said combustion chamber, said control module being further configured to discontinue delivery of fuel to said combustion chamber during the next predetermined number of ignition cycles in response to said ion sense signal indicating pre-ignition.

9. A method of detecting pre-ignition in a combustion chamber of an internal combustion engine comprising the steps of:

(A) defining a dwell interval corresponding to a charging time for an ignition coil provided for delivery energy to a spark plug connected thereto;

(B) commencing charging of the ignition coil at a start of the dwell interval;

(C) applying a voltage bias to the spark plug during the dwell interval;

(D) generating an ion sense signal indicative of an ion current through the spark plug; and (E) detecting pre-ignition when the ion sense signal satisfies predetermined criteria.

10. The method of claim 9 further including the step of:

delivering fuel to the combustion chamber prior to the step of applying the voltage bias.

11. The method of claim 9 wherein said detecting pre-ignition step includes the substeps of:

establishing a reference signal;

comparing the ion sense signal with the reference signal; and producing a pre-ignition detect signal in accordance with said comparison.

12. The method of claim 9 wherein said detecting pre-ignition step includes the substeps of:

establishing a reference signal;

integrating the ion sense signal to generate an integrated ion sense signal;

comparing the integrated ion sense signal with the reference signal; and producing a pre-ignition detect signal in accordance with said comparison.

* * * * *